US007298761B2

(12) United States Patent
Hong

(10) Patent No.: US 7,298,761 B2
(45) Date of Patent: Nov. 20, 2007

(54) LINK PATH SEARCHING AND MAINTAINING METHOD FOR A BLUETOOTH SCATTERNET

(75) Inventor: Alexander T. P. Hong, Taipei (TW)

(73) Assignee: Institute for Information Industry, Taipei (TW)

( * ) Notice: Subject to any disclaimer, the term of this patent is extended or adjusted under 35 U.S.C. 154(b) by 903 days.

(21) Appl. No.: 10/434,201

(22) Filed: May 9, 2003

(65) Prior Publication Data

US 2004/0223512 A1    Nov. 11, 2004

(51) Int. Cl.
    *H04J 3/16*      (2006.01)
    *H04J 3/22*      (2006.01)
    *H04B 7/00*      (2006.01)
    *H04Q 7/20*      (2006.01)

(52) U.S. Cl. ............... 370/466; 370/310; 455/41.2; 455/449

(58) Field of Classification Search ........... 370/466, 370/310; 455/41.1–41.3, 444, 449
See application file for complete search history.

(56) References Cited

U.S. PATENT DOCUMENTS

| | | | |
|---|---|---|---|
| 6,535,498 B1 * | 3/2003 | Larsson et al. ............ | 370/338 |
| 6,834,192 B1 * | 12/2004 | Watanabe et al. .......... | 455/444 |
| 2002/0039357 A1 * | 4/2002 | Lipasti et al. ............. | 370/338 |
| 2002/0044549 A1 * | 4/2002 | Johansson et al. ........ | 370/386 |
| 2003/0110291 A1 * | 6/2003 | Chen ........................ | 709/244 |
| 2003/0202477 A1 * | 10/2003 | Zhen et al. ................ | 370/248 |

* cited by examiner

*Primary Examiner*—Seema S. Rao
*Assistant Examiner*—Jianye Wu
(74) *Attorney, Agent, or Firm*—Bacon & Thomas, PLLC

(57) ABSTRACT

A link path search and maintain method for establishing link search table between two bluetooth devices such that the devices can transfer data to/from others device located in a bluetooth scatternet. When initialization of a slave bluetooth device, the new member in a bluetooth piconet receives a link search table that transmitted from a master bluetooth device to establish a local link search table; as the link is broken or the link search table needs be updated, the slave bluetooth device executes a link search establishment transmission procedure or a link search establishment receiving procedure to update the local link search table or establish a new link search table. Then, the slave bluetooth device encapsulates the bluetooth data packet according the information of the local link search table in order to transfer data packet in a scatternet.

11 Claims, 14 Drawing Sheets

| Link path | step | node | IP Flag | Source IP addr | Source BD_addr | Sender BD_addr | Link search number | Search Link ID1 | Search Link ID2 | Search Link ID3 | Search Link ID4 | Search Link ID5 | Search Link ID6 | Search Link ID7 |
|---|---|---|---|---|---|---|---|---|---|---|---|---|---|---|
| A→B | 1 | | IPV4 | 10.x.x.20 | BD_A | BD_A | 1 | | | | | | | |
| B→D | 2 | | IPV4 | 10.x.x.20 | BD_A | BD_B | 2 | 3 | | | | | | |
| D→E | 3 | | IPV4 | 10.x.x.20 | BD_A | BD_D | 3 | 3 | 5 | | | | | |
| E→F | 4 | | IPV4 | 10.x.x.20 | BD_A | BD_E | 4 | 3 | 5 | 6 | 4 | | | |
| F→G | 5 | | IPV4 | 10.x.x.20 | BD_A | BD_F | 5 | 3 | 5 | 6 | 4 | 6 | | |
| G→H | 6 | | IPV4 | 10.x.x.20 | BD_A | BD_G | 6 | 3 | 5 | 6 | 4 | 6 | 4 | |
| H→J | 7 | | IPV4 | 10.x.x.20 | BD_A | BD_H | 7 | 3 | 5 | 6 | 4 | | | |

FIG. 14

Note:
The IP address of node A is 10.x.x.20 and the bluetooth address is BD_A
The IP address of node B is 10.x.x.22 and the bluetooth address is BD_B
The IP address of node D is 10.x.x.23 and the bluetooth address is BD_D
The IP address of node E is 10.x.x.24 and the bluetooth address is BD_E
The IP address of node F is 10.x.x.25 and the bluetooth address is BD_F
The IP address of node G is 10.x.x.26 and the bluetooth address is BD_G
The IP address of node H is 10.x.x.27 and the bluetooth address is BD_H

LINK PATH SEARCHING AND MAINTAINING METHOD FOR A BLUETOOTH SCATTERNET

BACKGROUND OF THE INVENTION

1. Field of the Invention

The present invention relates to the technical field of bluetooth scatternet and, more particularly, to a link path searching and maintaining method that is used in a bluetooth scatternet.

2. Description of Related Art

FIG. 1 shows a method for transferring data in a bluetooth network. The whole network is divided into several isolated piconets. In each piconet, there are one master bluetooth device and multiple salve bluetooth devices. The master device controls the data transfer procedure to and from the target slave device in a piconet. In the specification of bluetooth, a scatternet that is formed by multiple piconets is mentioned. However, in the specification, there is no rule and guideline provided for data transfer in a scatternet. As shown in FIG. 2, although all piconets can form a scatternet, in accordance with the current specification and technology of piconet and scatternet, data can only be transferred inside a specific piconet but not crossing the boundary of the piconet. That is, data cannot be transferred in a scatternet, link search table cannot be established and initialized in a scatternet and link search table cannot be updated as the link is broken in a scatternet. Therefore, there is a need to have a novel design to transfer data in a scatternet that can mitigate and/or obviate the aforementioned problems.

SUMMARY OF THE INVENTION

The object of the present invention is to provide a link path searching and maintaining method capable of establishing link search table between two bluetooth devices located in a scatternet based on the bluetooth technology, so as to remove the limitation of the current bluetooth technology that can only transfer data in a piconet.

One object of the present invention is to provide a link path search and maintain method for establishing link search table between two bluetooth devices such that the devices can transfer data to/from others device located in a bluetooth scatternet. The method comprises the steps of: (A) when initialization of a slave bluetooth device that add in a bluetooth piconet, the slave bluetooth device receives a link search table that transmitted from a master bluetooth device to establish a local link search table; (B) as the link is broken or the link search table needs be updated, the slave bluetooth device executes a link search establishment transmission procedure; and (C) the slave bluetooth device executes a link search establishment receiving procedure as receives a link search packet to update the local link search table or establish a new link search table. Then, the slave bluetooth device encapsulates the bluetooth data packet according the information of the local link search table in order to transfer data packet in a scatternet.

Another object of the present invention is to provide a link searching and maintaining method for establishing a link search table between two bluetooth devices located in a bluetooth scatternet, the bluetooth device comprises a link update variable, a link update timer, an initialization procedure executing timer, an initialization procedure trigger timer, a missing timer and a link search table which sends a link searching packet to establish the link search table, wherein the link searching packet comprises a link number field, a source IP address field, a source bluetooth address (BD_Addr) field, a sender bluetooth address (BD_Addr) field, a link search number field, and multiple search link identification fields, the method comprising: (A) filling the corresponding fields of the link search packet; (B) enabling the link update variable and link update timer; (C) filling the link number field with 0; and (D) encapsulating with the bluetooth packet header and transmitting through the bluetooth channel.

Other objects, advantages, and novel features of the invention will become more apparent from the following detailed description when taken in conjunction with the accompanying drawings.

BRIEF DESCRIPTION OF THE DRAWINGS

FIG. 14 shows the link search table for transmitting the link search packet from node A to node J of as shown in FIG. 13;

DETAILED DESCRIPTION OF THE PREFERRED EMBODIMENT

Figure 1:
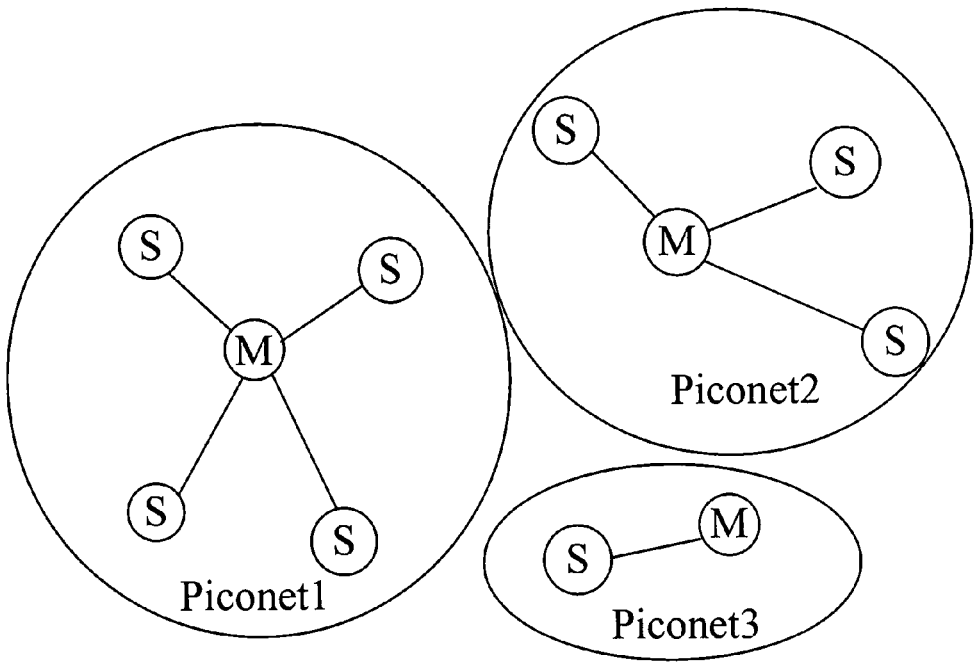
FIG. 1 shows the data transfer in a conventional bluetooth piconet.
Figure 2:
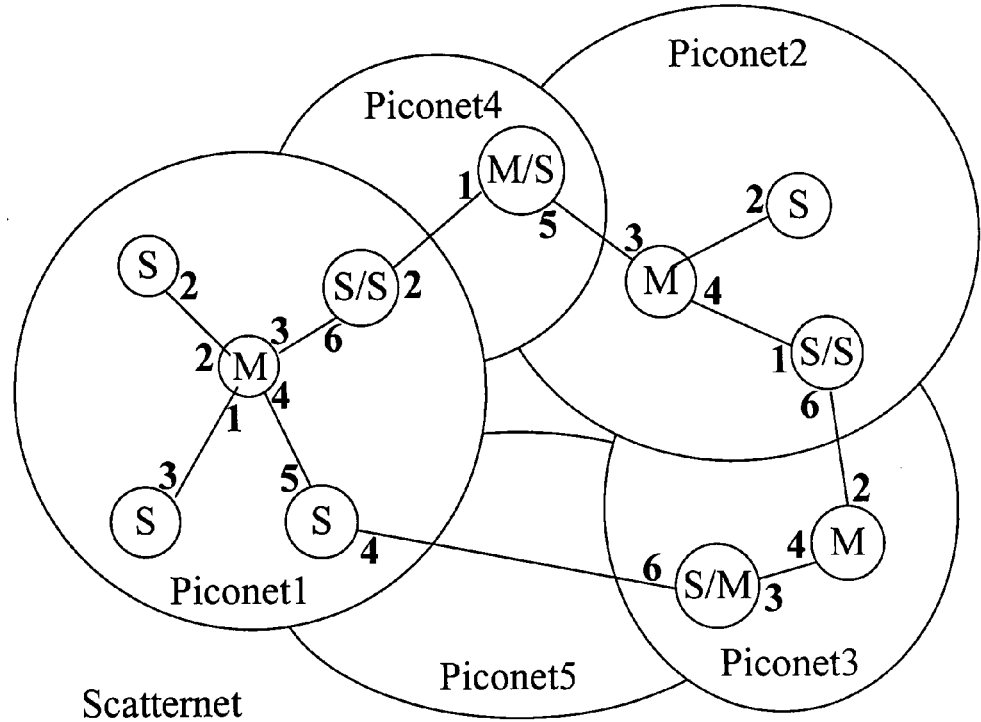
FIG. 2 shows multiple piconets forming a scatternet in conventional bluetooth.
Figure 3:
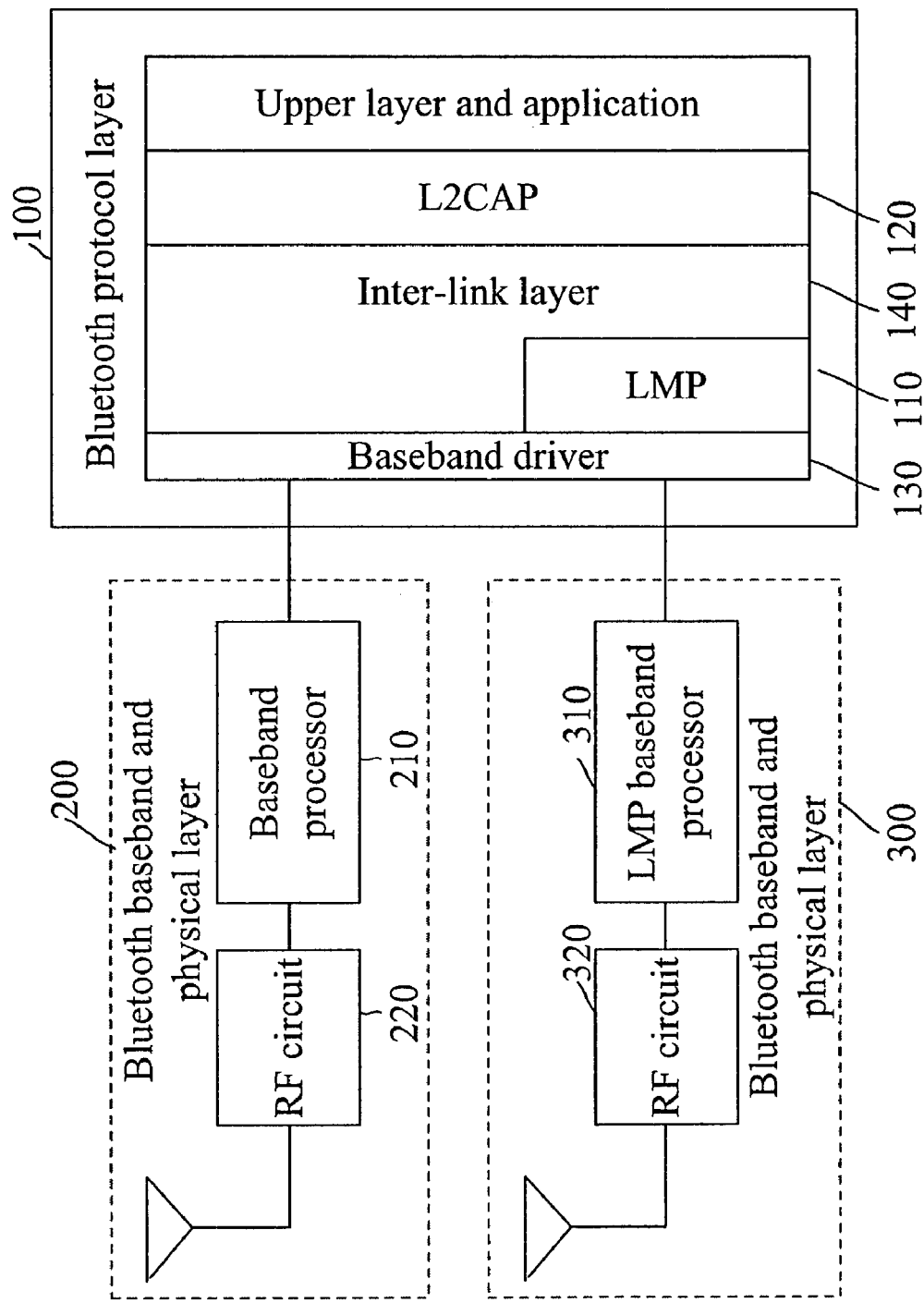
FIG. 3 shows system architecture of a bluetooth device in accordance with the present invention.

Referring now to FIG. 3, there is illustrated the system architecture of a bluetooth device in accordance with the present invention. The device has a bluetooth protocol layer 100 and a bluetooth baseband and physical layer 200. The bluetooth protocol layer 100 has a logical link control and adaptation protocol (L2CAP) 120 and a link manager protocol (LMP) 110 for handling the corresponding protocol of bluetooth technology. The bluetooth baseband and physical layer 200 has a baseband processor 210 and a RF circuit 220 for handling the corresponding baseband and radio frequency of bluetooth technology. When exhausting the bandwidth of bluetooth channel and affecting the data transmitting by executing the link searching method of the present invention, it can add a bluetooth baseband and physical layer 300, an inter-link layer 140, a baseband drivers 130 as shows in FIG. 3. The bluetooth baseband and physical layer 300 executes exclusively for link manager protocol (LPM) and connects with the baseband drivers 130. The inter-link layer 140 provides an interface between the logical link control and adaptation protocol (L2CAP) 110 and the baseband drivers 130.

Figure 4:
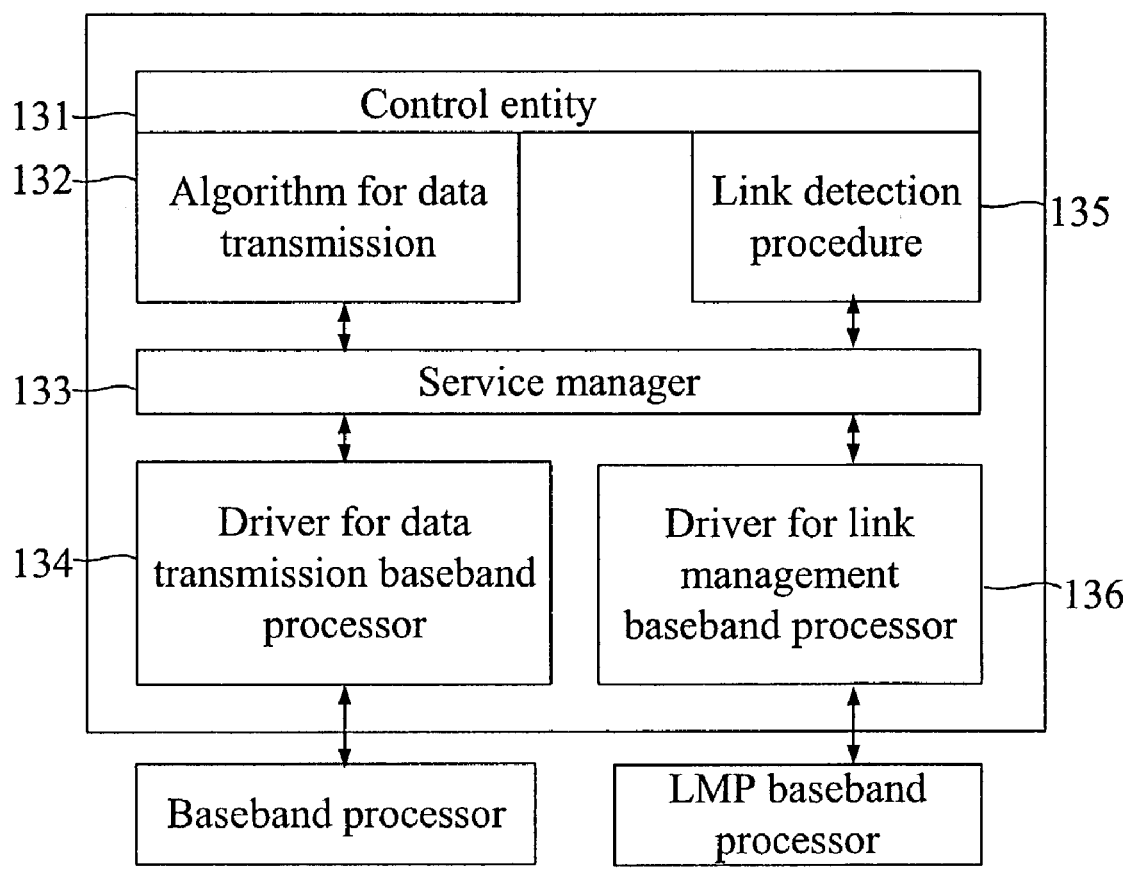
FIG. 4 shows the architecture of the baseband driver of the present invention.

FIG. 4 shows an architecture of the baseband driver 130 of the present invention that comprises a control entity 131, a data transmission procedure 132, a service manager 133, a driver for data transmission baseband processor 134, a link detection procedure 135 and a driver for link management baseband processor 136. In comparison with the conventional bluetooth baseband driver, the link detection procedure 135 and the driver for link management baseband processor 136 are provided to execute the management of links for preventing the bandwidth of the data transmission from being reduced.

Figure 5:
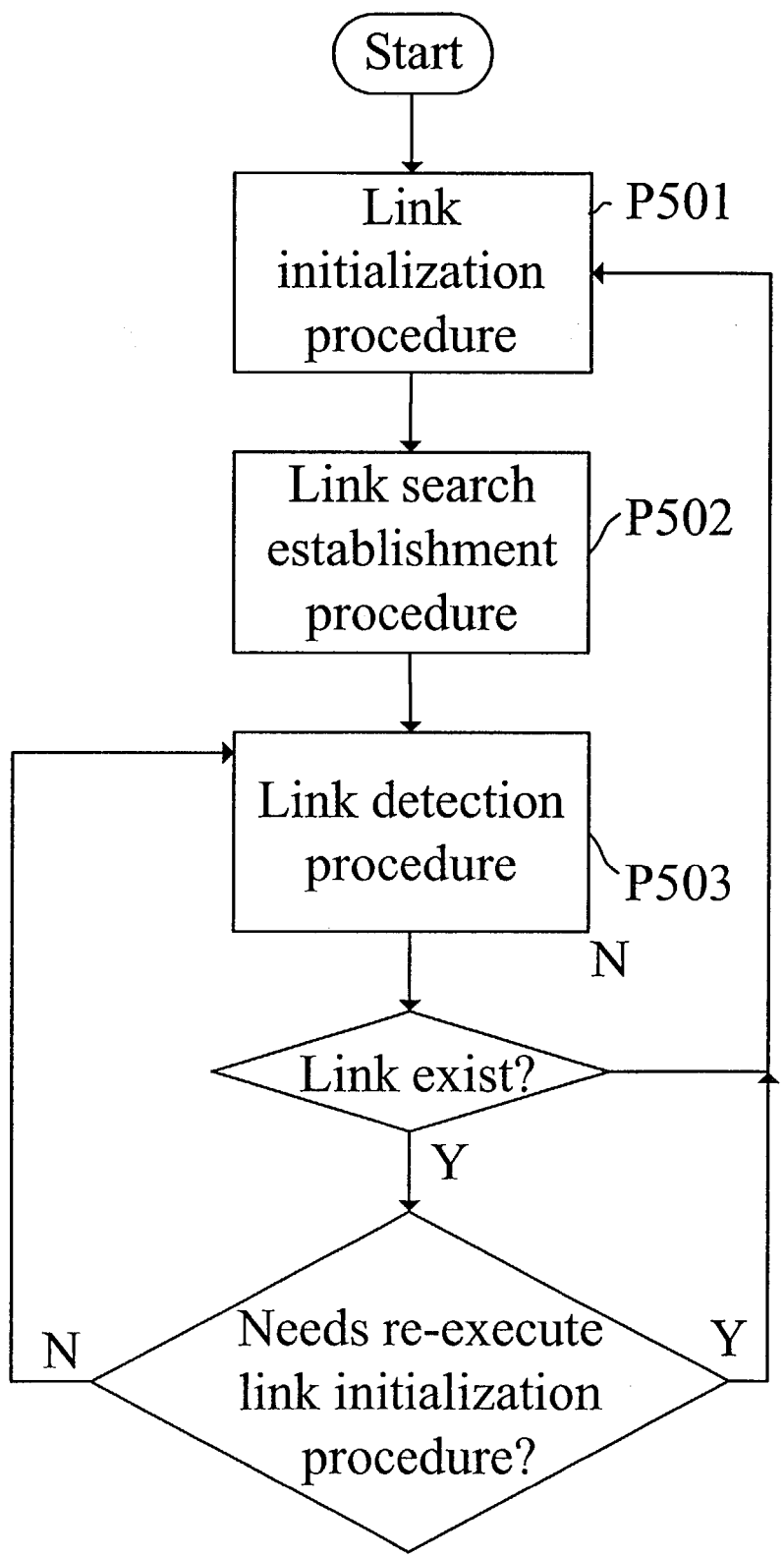
FIG. 5 shows the flowchart for link search of the present invention.

FIG. 5 shows an embodiment of the link path searching method for a bluetooth scatternet according to the present invention, which transfers data packet between bluetooth devices in a scatternet. The bluetooth device according to the present invention comprises multiple link detection timers, a detection procedure timer, a master/slave flag, an initialization procedure executing timer, an initialization procedure trigger timer and a missing timer. The link path searching method executes a link initialization procedure (P501) first. When resetting or initializing a link, the link initialization procedure determines whether the bluetooth device is a slave or a master device and initializes the corresponding timers. In the link search establishment procedure (P502), it searches all possible paths for transferring data packet and establishes a link path table. Then, when the corresponding link detection timer of a link expires after a pre-determined period, the link detection procedure (P503) is resumed to detect whether the link exists or not. If the link is not existed, the process goes back to the link initialization procedure (P501). If the link is existed, it further determines whether to execute the link initialization procedure again. If yes, the process goes back to link initialization procedure (P501), otherwise the process goes back to the link detection procedure (P503).

Figure 6:
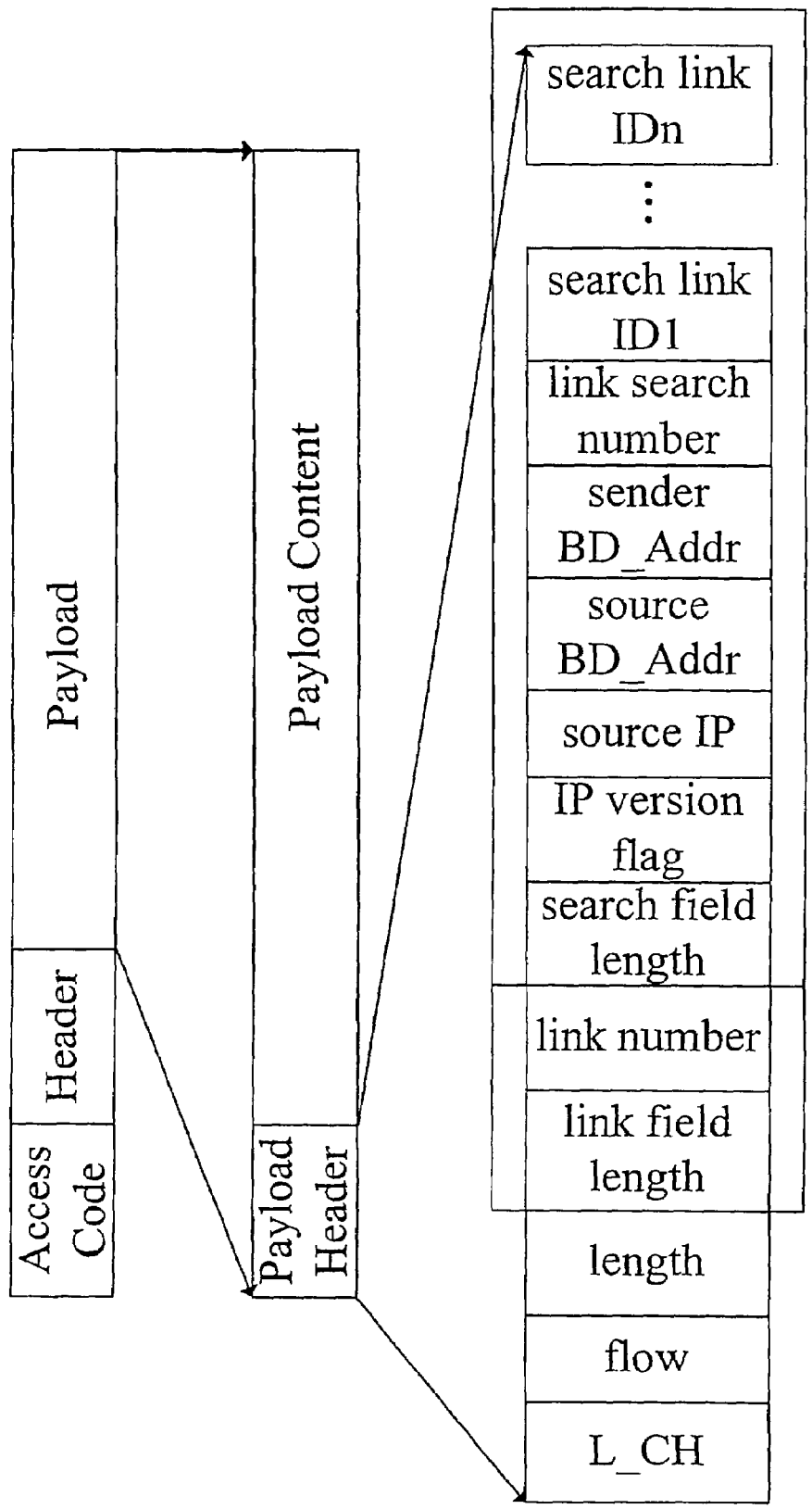
FIG. 6 shows the link search packet format of the present invention.

The link path searching and maintaining method for a bluetooth scatternet according to present invention generates a link search packet by internal mechanism of the inter-link layer 140. FIG. 6 shows the data packet format of the link search packet according to present invention, which includes a link field length, a link number, a search field length, an IP version flag, a source IP, a source BD_addr, a sender BD_addr, a link search number, and multiple search link IDs (ID1, ID2, IDn). The bluetooth devices broadcast link search packets on the bluetooth channel to establish a link search table, and the bluetooth device comprises a link update variable and a link update timer.

Figure 7:
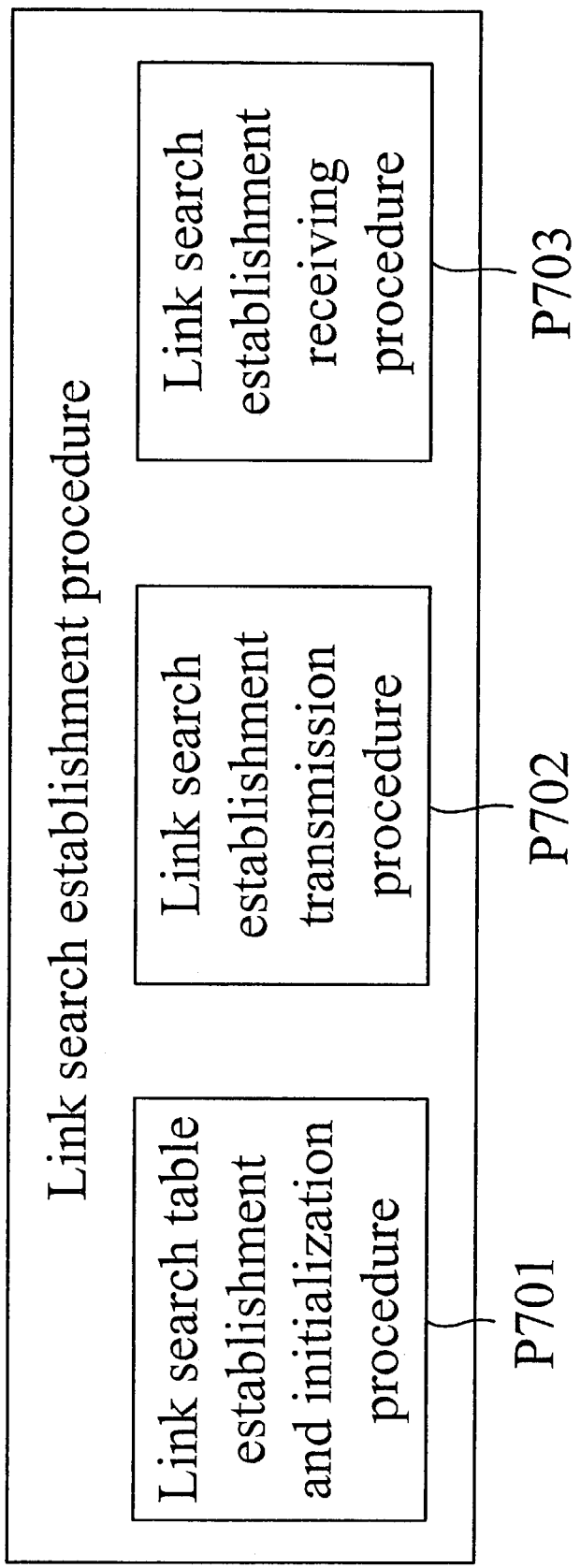
FIG. 7 shows the procedure for establishing link search establishment of the present invention.
Figure 8:
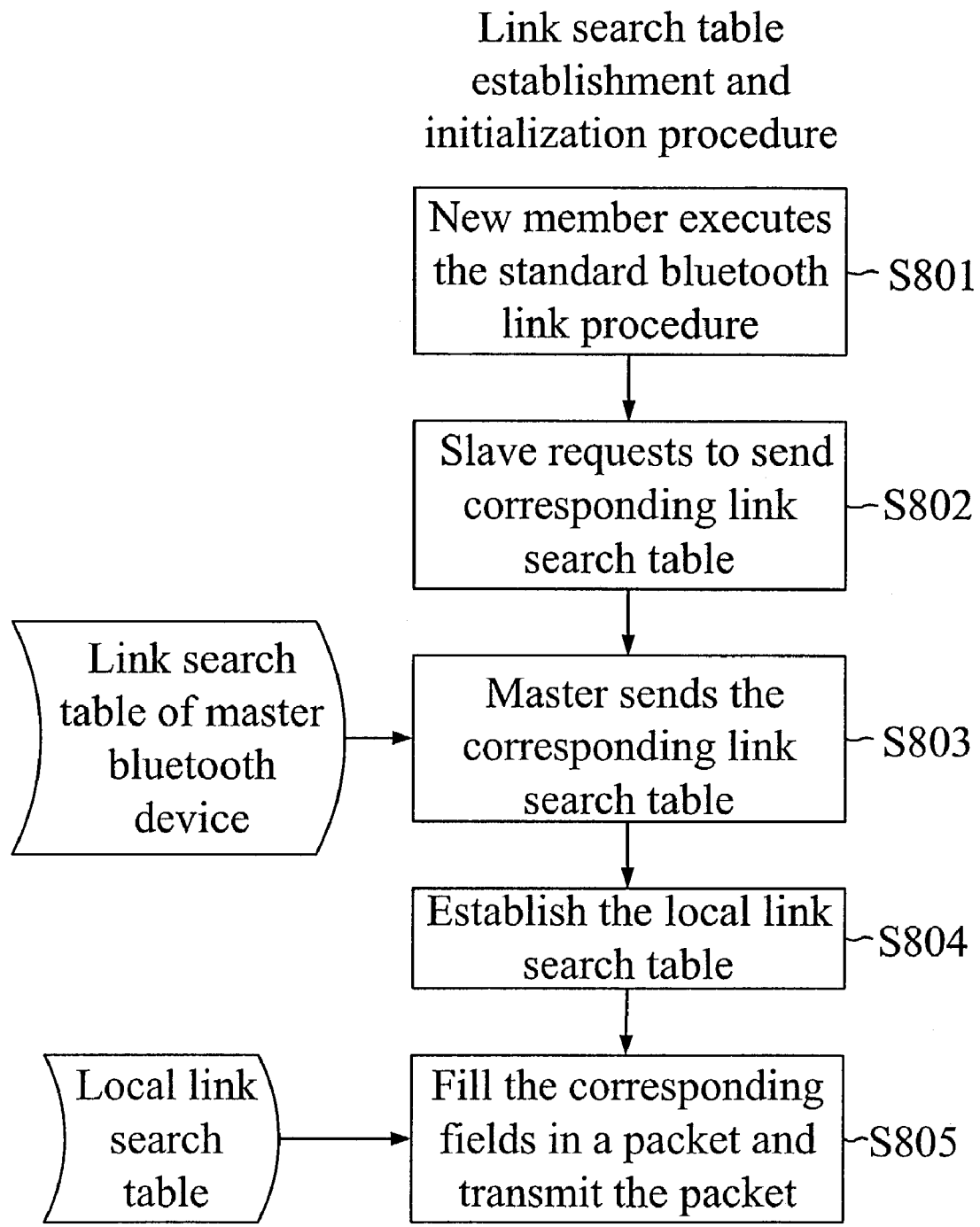
FIG. 8 shows the flowchart for establishing and initializing the link search table of the present invention.
Figure 9:
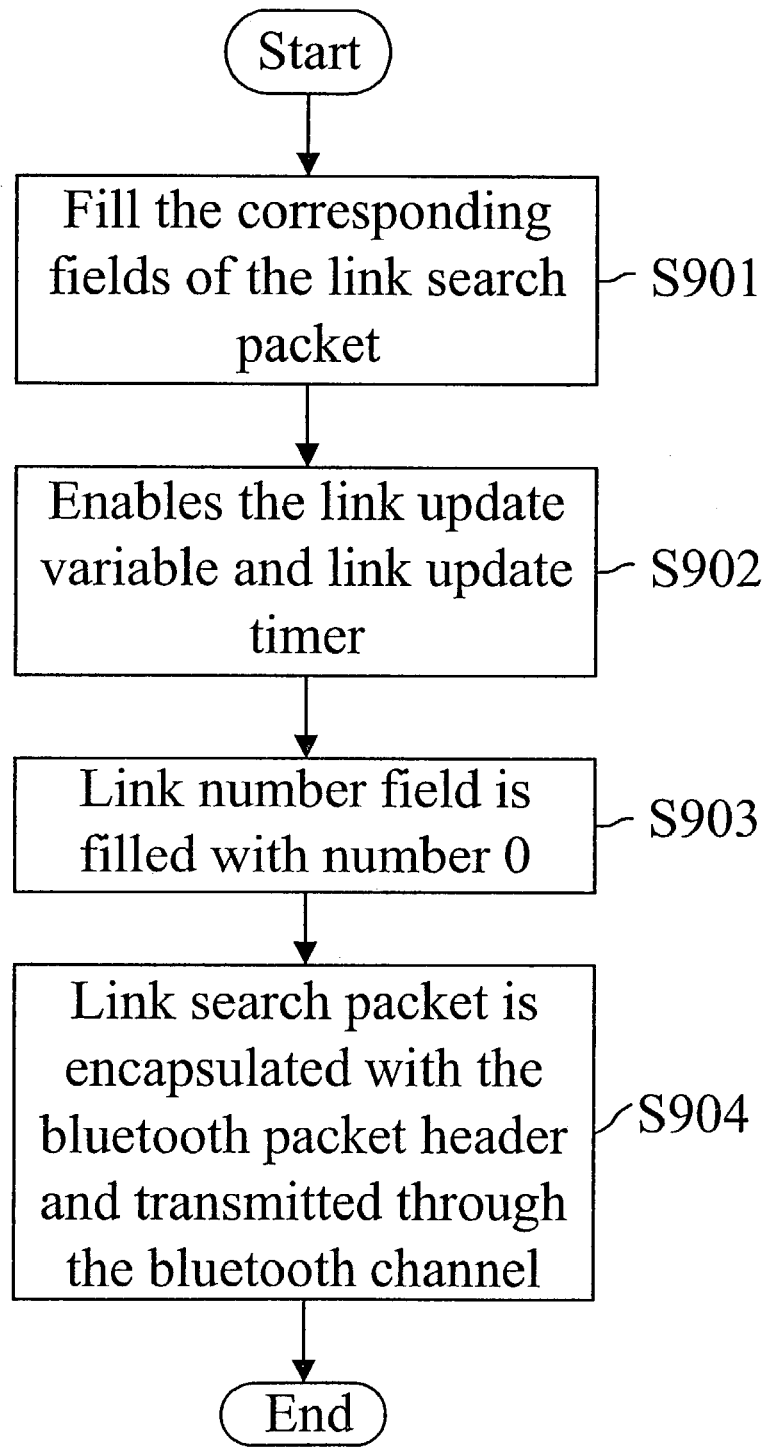
FIG. 9 shows the flowchart for updating the link search table as a link is broken in accordance with the present invention.
Figure 10A:
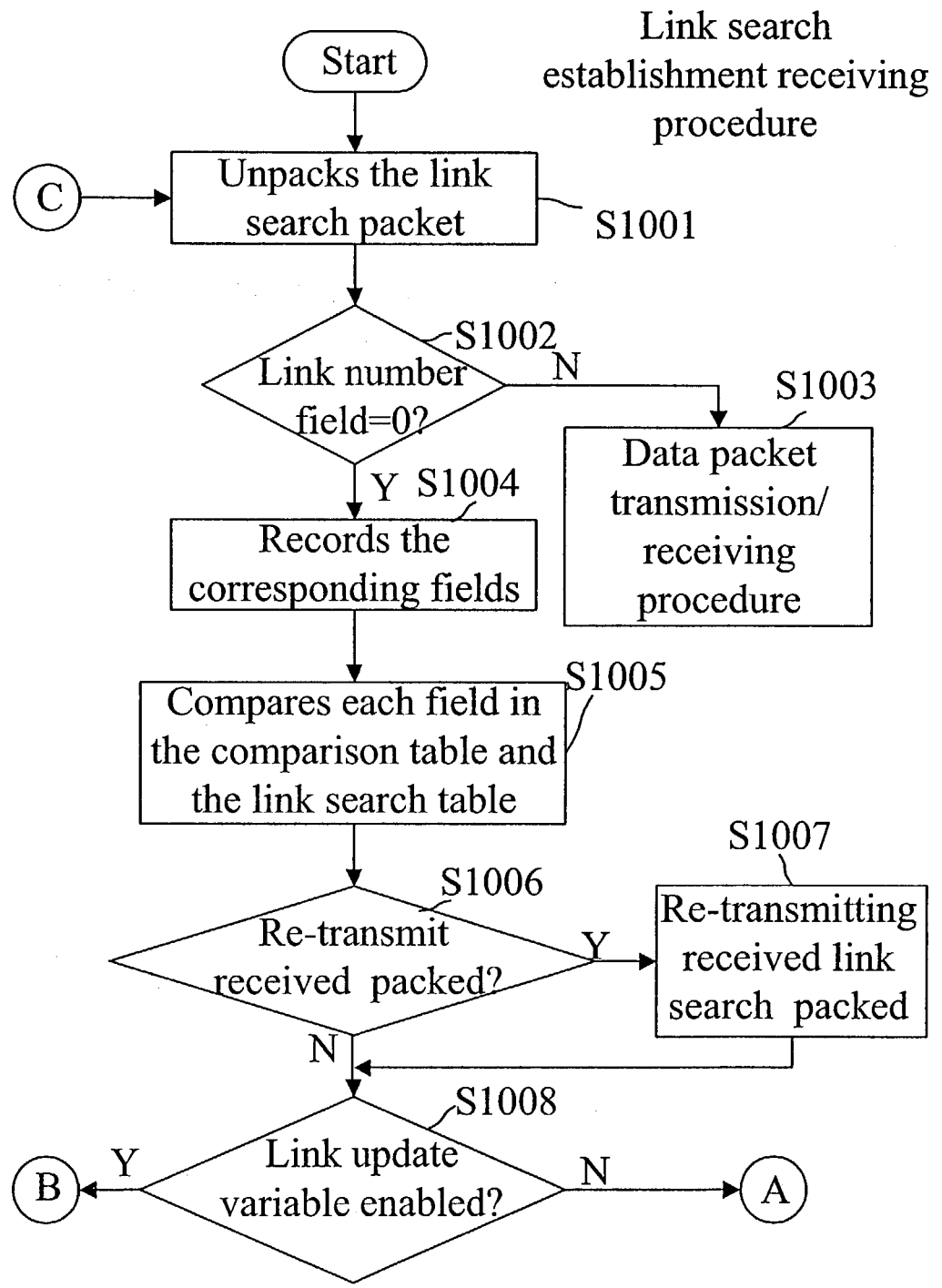
FIG. 10 shows the flowchart for receiving link search packet of a bluetooth device in accordance with the present invention.
Figure 10B:
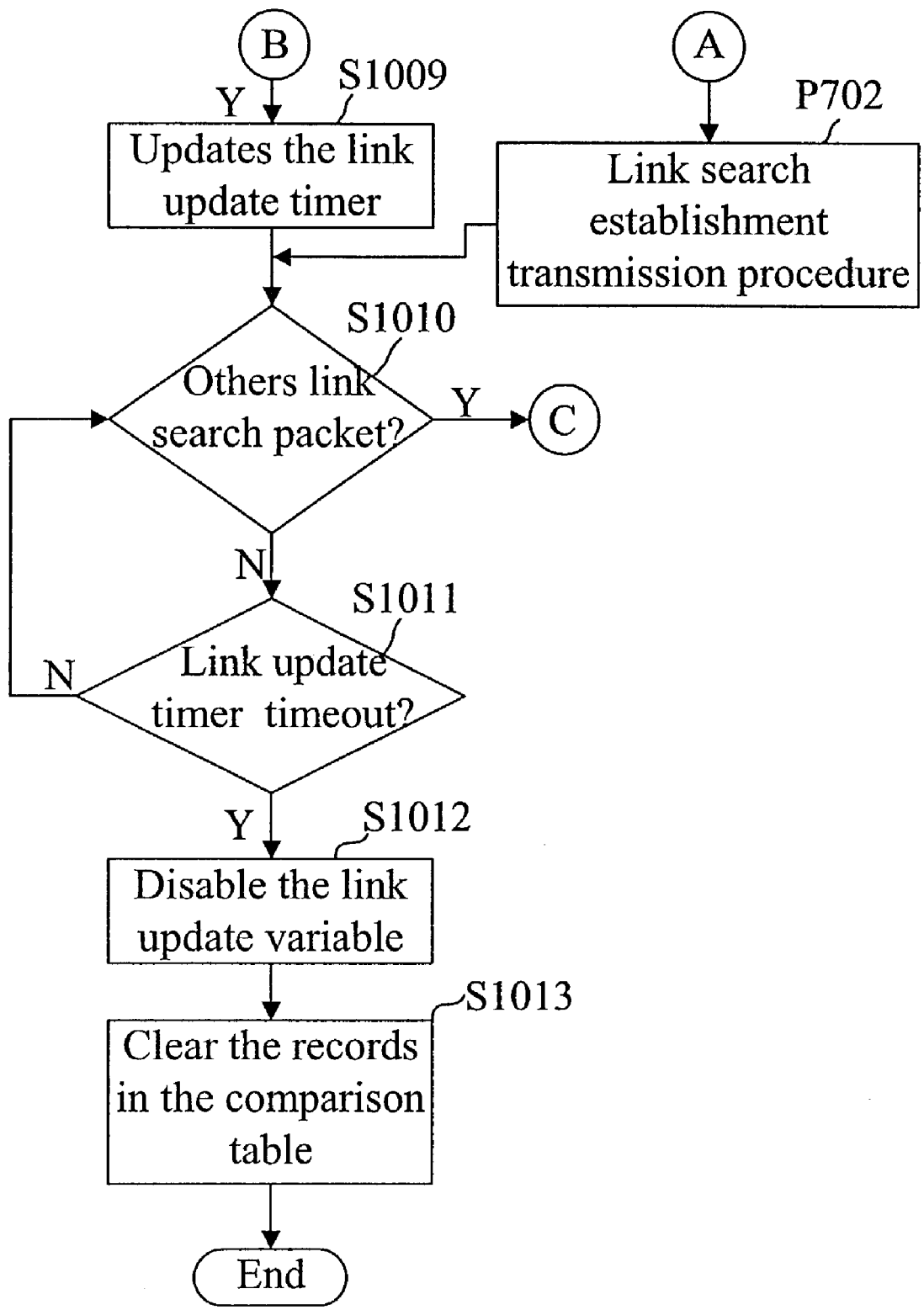

FIG. 7 schematically illustrates the link search establishment procedure (P502) in accordance with the present invention. It comprises a link search table establishment and initialization procedure (P701), a link search establishment transmission procedure (P702) and a link search establishment receiving procedure (P703). FIG. 8 shows the flowchart for the link search table establishment and initialization procedure (P701). FIG. 9 shows the flowchart for the link search establishment transmission procedure (P702) that is triggered when a link is broken or the bluetooth device cannot find the target bluetooth device for transferring data packets thereto. FIG. 10 shows the flowchart for the link search establishment receiving procedure (P703) that is triggered when a bluetooth device receives a link search packet.

As shown in FIG. 8, in step S801, when a new bluetooth device is involved in a piconet, the new device executes the standard bluetooth link procedure. In step 802, the new device is linked with the piconet in the logical link control and adaptation protocol (L2CAP) layer, and the slave bluetooth device requests the master bluetooth device to send its corresponding link search table. In step 803, the master bluetooth device sends the corresponding link search table to the slave bluetooth device. In step 804, the new device establishes or updates the local link search table based on the received link search table. In step 805, the new device fills the corresponding fields in a packet according to the local link search table to transmit the packet.

FIG. 9 shows the flowchart for the link search establishment transmission procedure (P702) that is triggered when a link is broken or the bluetooth device cannot find the target bluetooth device for transferring data packets thereto. In step S901, it fills the corresponding fields of the link search packet, wherein the link search number is filled with number 1 to indicate that the link search packet is first transmitted. The source IP field is filled with the IP of the bluetooth device. The source BD_Addr field is filled with the bluetooth address of the bluetooth device to map the IP address and the bluetooth address. The sender BD_Addr field is filled with the bluetooth address of the bluetooth device to indicate that the device is the first device to send the link search packet.

In step S902, it enables the link update variable and link update timer. In step S903, the link number field is filled with number 0 to indicate that the packet is a link search packet and is transmitted for broadcasting. In step S904, the link search packet is encapsulated with the bluetooth packet header and transmitted through the bluetooth channel.

FIG. 10 shows the flowchart for the link search establishment receiving procedure (P703) that is triggered when a bluetooth device receives a link search packet. In step S1001, the bluetooth device that receives a link search packet unpacks the link search packet. In step S1002, it is determined whether the link number field is equal to 0 or not. If the link number field is not equal to 0, it means that the packet is a data packet and a data packet transmission/receiving procedure is performed (step S1003). If the link number field is equal to 0, it means that the packet is a link search packet and the process goes to step S1004.

In step S1004, the corresponding fields of the received link search packet are recorded to a comparison table in the bluetooth device. The corresponding fields are IP version flag, source IP, and source BD_addr and sender BD_addr. It also records the link search number with value m and corresponding search link IDm to the comparison table.

In step S1005, each field in the comparison table and the link search table is compared to generate a flag. In step S1006, according to the flag, it determines whether to re-transmit the received link search packet or not. If yes, the received link search packet is re-transmitted (step S1007).

If it decides not to re-transmit the received link search packet, step S1008 is executed to determine whether to enable link update variable or not. If the link update variable is not enabled, it means that the bluetooth device did not transmit a link search packet and has never executed the link search establishment transmission procedure (P702). Then, the process goes to the link search establishment transmission procedure (P702). If the link update variable is enabled, it means that the bluetooth device has transmitted a link search packet and has executed the link search establishment transmission procedure (P702). Therefore, it updates the link update timer in step S1009.

In step S1010, it determines whether the bluetooth device receives other link search packet or not. If the bluetooth device receives other link search packet, the process goes back to step S1001. In step S1011, it determines whether the link update timer is expired or not. If the link update timer is not expired, it means that the bluetooth device can continuously receive the link search packet transmitted from other bluetooth device and then the process goes back to step S1010. In step S1011, if the link update timer is expired, it means that there is no bluetooth device in the scatternet to transmit the link search packet, and then step S1012 is executed to disable the link update variable of the bluetooth device. In step S1013, the records in the comparison table are cleared.

Figure 11:
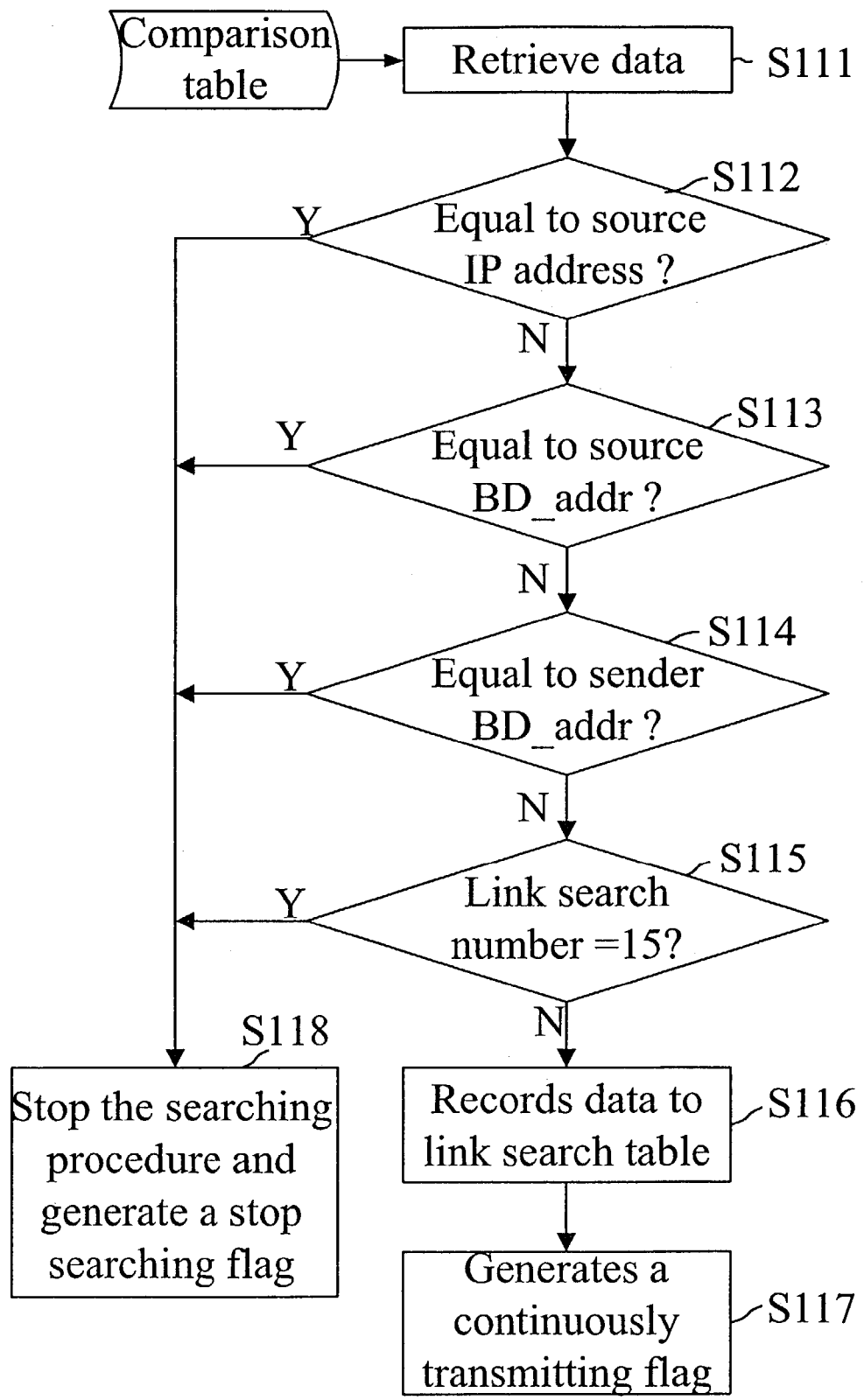
FIG. 11 shows the flowchart for comparing the comparison table and the link search table in accordance with the present invention.

FIG. 11 shows the flowchart for comparing the comparison table and the link search table in step S1005. In step S111, it retrieves the corresponding data from the comparison table. In step S112, it determines whether the source IP address is equal to the IP address of the bluetooth device or not. If the source IP address is not equal to the IP address of the bluetooth device, step S113 is executed to determine whether the source BD_addr is equal to the BD_addr of the bluetooth device or not. If the source BD_addr is not equal to the BD_addr of the bluetooth device, step S114 is executed to determine whether the sender BD_addr is equal to the BD_addr of the bluetooth device or not. The comparisons in the steps S112, S113 and S114 are provided to prevent the bluetooth device from receiving the link search packets that are sent by itself.

If the sender BD_addr is not equal to the BD_addr of the bluetooth device, step S115 is executed to determine whether the link search number is equal to a specific number, for example15, or not. If the link search number is not equal to 15, it records the source IP address, source BD_addr and multiple search link IDs to the link search table of the bluetooth (step S116). In step S117, it generates a flag for continuously transmitting the link search packet.

If the source IP address is equal to the IP address of the bluetooth device in step S112, or the source BD_addr is equal to the BD_addr of the bluetooth device in step S113, or the sender BD_addr is equal to the BD_addr of the bluetooth device in step S114, it means that the bluetooth device receives the link search packet that is sent by itself. Then, step S118 is executed to stop the searching procedure and generate a stop searching flag. In step S115, if the link search number is equal to 15, step S118 is also executed to stop the searching procedure.

Figure 12:
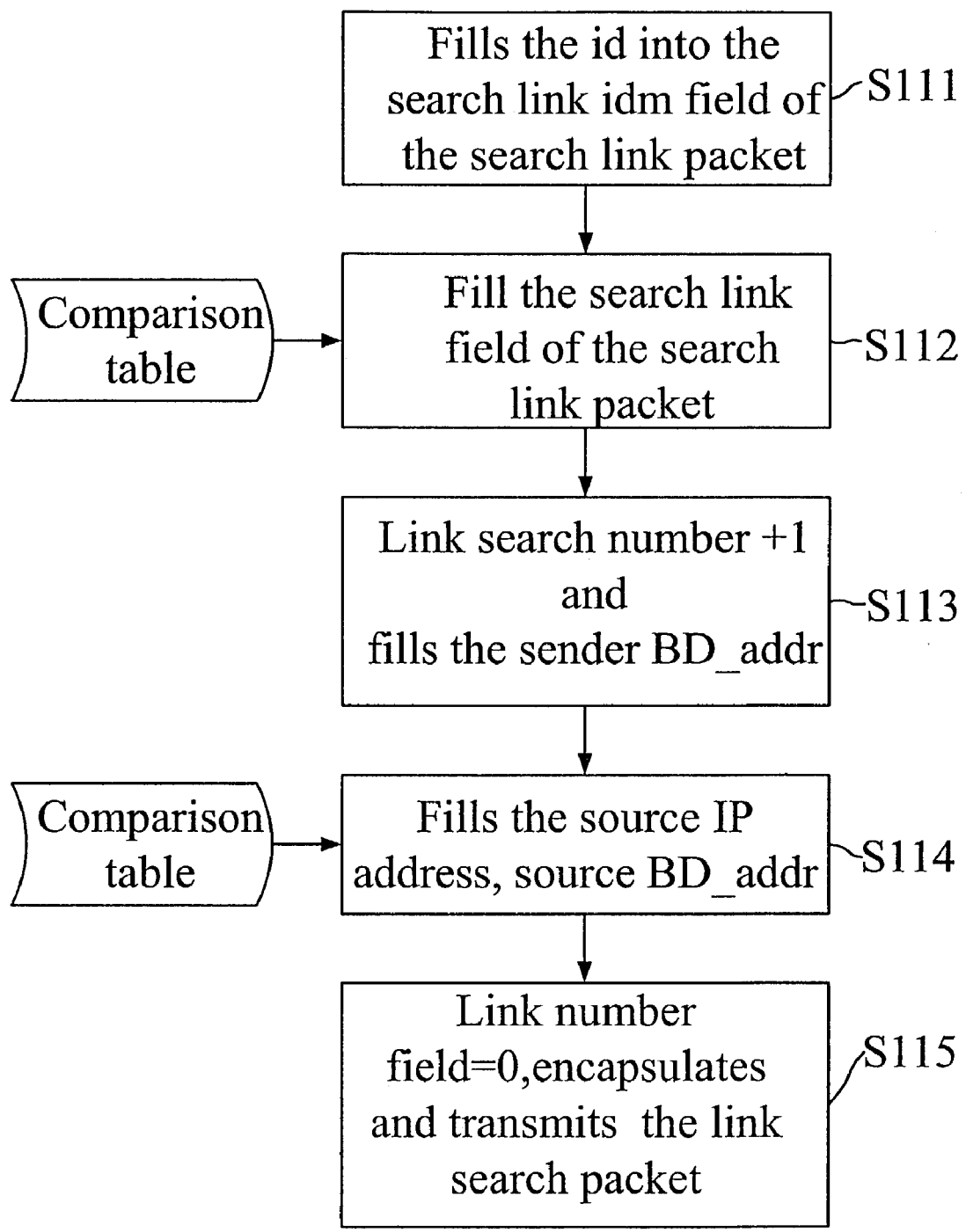
FIG. 12 shows the flowchart for re-transmitting the link search packet in accordance with the present invention.

If it decides to re-transmit the received link search packed in step S1006, step S1007 is executed to re-transmit the received link search packet. FIG. 12 shows the flowchart for re-transmitting the received link search packet in step S1007. In step S121, it fills the ID of the link that receives the search link packet into the search link IDm field of the search link packet. It retrieves corresponding search link IDs in the comparison table and fills the same into the search link field of the search link packet (step S122). In step S123, it adds 1 to the link search number field and fills the sender BD_addr with the bluetooth address of the bluetooth device. In step S124, it fills the source IP address and the source BD_addr with data retrieved from the comparison table. In step S124, it fills the link number field with 0 and encapsulates the link search packet with the standard bluetooth header, and then the packet is transmitted by the bluetooth channel.

Figure 13:
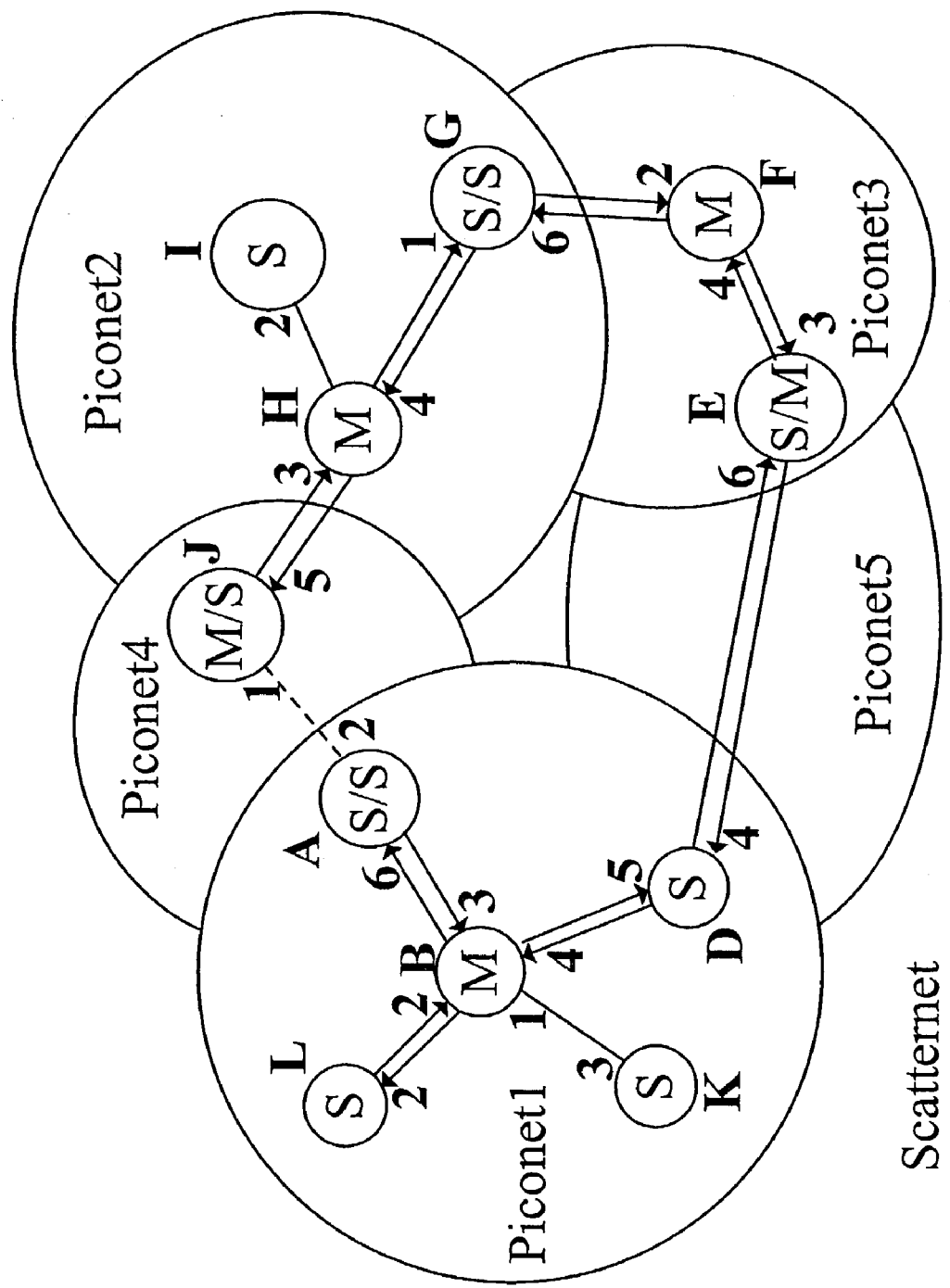
FIG. 13 shows scatternet system architecture for transmitting the link search packet from node A to node J in accordance with the present invention.

FIG. 13 shows a scatternet system architecture for transmitting the link search packet from node A to node J in accordance with the present invention. FIG. 14 shows the variations of the fields in the link search packet from node A to node J of FIG. 13. There is a link between nodes A and J. When the link is broken, the node A sends a link search packet to find a data transfer path between nodes A and J. In step 1, node A broadcasts a link search packet by the bluetooth channel for being received by the node B. From the view point of node B, the link search packet is sent by node A, thus the search link ID1 field is null.

In step 2, the link search packet is sent by node B and received by node D. From the view point of node D, the link search packet is sent by node B and received by node B using the link 3, and thus the search link ID1 field is filled with 3 and the sender BD_addr field is filled with the bluetooth address of node B (BD_B).

In step 3, the link search packet is sent by node D and received by node E. From the view point of node E, the link search packet is sent by node D and received by node D using the link 5. Thus, the search link ID1 field is filled with 3, the search link id2 field is filled with 5 and the sender BD_addr field is filled with the bluetooth address of node D (BD_D). The subsequent steps are similar to those described aforementioned. Finally, node J can establish a link search table with node A when the step 7 is finished.

In view of the foregoing, it is known that the present invention utilizes the steps in FIG. 8 to establish and initialize the link search table and steps in FIG. 9, FIG. 10, FIG. 11 and FIG. 12 to update and re-transmit the link search table so as to achieve the purpose of transferring data packets in a bluetooth scatternet, thereby removing the limitation of the conventional bluetooth technology that can only transfer data in a piconet.

Although the present invention has been explained in relation to its preferred embodiment, it is to be understood that many other possible modifications and variations can be made without departing from the spirit and scope of the invention as hereinafter claimed.

What is claimed is:

1. A link searching and maintaining method for establishing a link search table between a first bluetooth device in one piconet to a second bluetooth device in another piconet with both piconets located in a bluetooth scatternet, each bluetooth device including a link update variable, a link update timer, an initialization procedure executing timer, an initialization procedure trigger timer, a missing timer and a link search table, wherein the first Bluetooth device sends a link searching packet to the second bluetooth device to establish the link search table, wherein the link searching packet comprises a link number field, a source IP address field, a source bluetooth address (BD_Addr) field, a sender bluetooth address (BD_Addr) field, a link search number field, and multiple search link identification fields, the method comprising:

(A) filling the corresponding fields of the link search packet;
(B) enabling the link update variable and link update timer;
(C) filling the link number field with 0; and
(D) encapsulating with the bluetooth packet header and transmitting through the bluetooth channel.

2. The link searching and maintaining method for establishing a link search table between two bluetooth devices as claimed in claim 1, wherein the corresponding fields of the link search packet includes the source IP, source BD_Addr, sender BD_Addr, link search number and multiple search link fields.

3. The link searching and maintaining method for establishing a link search table between two bluetooth devices as claimed in claim 1, wherein when the bluetooth device in a scatternet receives a link search packet, the following steps are executed:
(E) un-packing the link search packet;
(F) determining whether the link number field of the link search packet is equal 0 or not;
(G) recording the corresponding fields of the link search packet to a comparison table if step (F) determines that value of the link number field is equal 0;
(H) comparing each field in the comparison table and the link search table and generating a flag;
(I) determining whether to re-transmit the received link search packed or not according to the flag;
(J) determining whether the link update variable is enabled or not if step (I) decides not to re-transmit the received link search packet;
(K) updating the link update timer if step (J) decides that the link update variable is enabled;
(L) determining whether others link search packet is received or not;
(M) determining whether the link update timer is expired or not if step (L) decides no other link search packet is received;
(N) disabling the link update variable of the bluetooth device if step (M) decides that the link update timer is expired; and
(O) clearing the records in the comparison table.

4. The link searching and maintaining method for establishing 1a ink search table between two bluetooth devices as claimed in claim 3, wherein when step
(M) determines that the link update timer is not expired, step (L) is executed.

5. The link searching and maintaining method for establishing a link search table between two bluetooth devices as claimed in claim 3, wherein when step (L) determines that there is other link search packet received, step (E) is executed.

6. The link searching and maintaining method for establishing a link search table between two bluetooth devices as claimed in claim 3, wherein when step (J) determines that the link update variable is not enabled, step (A) is executed.

7. The link searching and maintaining method for establishing a link search table between two bluetooth devices as claimed in claim 3, wherein step (H) further comprises:
(H1) retrieving data from the comparison table;
(H2) determining whether the source IP address is equal to the IP address of the bluetooth device or not;
(H3) determining whether the source BD_addr is equal to the BD_addr of the bluetooth device or not if step (H2) determines that the source PP address is not equal to the IP address of the bluetooth device;
(H4) determining whether the sender BD_addr is equal to the BD_addr of the bluetooth device or not if step (H3) determines that the source BD_addr is not equal to the BD_addr of the bluetooth device;
(H5) determining whether the link search number is equal to a pre-determined value or not if step (H4) determines that the sender BD_addr is not equal to the BD_addr of the bluetooth device;
(H6) recording corresponding data to the link search table of the bluetooth device;
(H7) generating a flag for continuously transmitting the link search packet.

8. The link searching and maintaining method for establishing a link search table between two bluetooth devices as claimed in claim 7, wherein, in step (H5), the pre-determined value is equal 15.

9. The link searching and maintaining method for establishing a link search table between two bluetooth devices as claimed in claim 7, wherein when step (H2) determines that the source IP address is equal to the IP address of the bluetooth device, step (H3) determines that the source BD_addr is equal to the BD_addr of the bluetooth device, step (H4) determines that the sender BD_addr is equal to the BD_addr of the bluetooth device, or step (H5) determines that the link search number is equal to 15, step
(H8) is executed f or stopping the searching procedure and generating a stop searching flag.

10. The link searching and maintaining method for establishing a link search table between two bluetooth devices as claimed in claim 3, wherein when step (I) determines to re-transmit the received link search packet, it further comprises:
(I1) filling the ID of the link that receives the search link packet into the search link IDm field of the search link packet;
(I2) retrieving corresponding search link IDs in the comparison table and filling the same into the search link field of the search link packet;
(I3) adding 1 to the link search number field and filling the sender BD_addr with the bluetooth address of the bluetooth device;
(I4) filling the source IP address, source BD_addr with data retrieving from the comparison table; and
(I5) encapsulating the link search packet with the standard bluetooth header and transmitting the packet by the bluetooth channel.

11. The link searching and maintaining method for establishing a link search table between two bluetooth devices as claimed in claim 3, wherein when step (F) determines that value of the link number field is not equal to 0, a data packet transmission/receiving procedure is further executed.

* * * * *